United States Patent
Xiao et al.

(10) Patent No.: US 12,167,377 B2
(45) Date of Patent: Dec. 10, 2024

(54) TIME-FREQUENCY BLOCK CANCELLATION

(71) Applicant: ZTE Corporation, Guangdong (CN)

(72) Inventors: Kai Xiao, Guangdong (CN); Xing Liu, Guangdong (CN); Peng Hao, Guangdong (CN); Xianghui Han, Guangdong (CN)

(73) Assignee: ZTE Corporation, Shenzhen (CN)

( * ) Notice: Subject to any disclaimer, the term of this patent is extended or adjusted under 35 U.S.C. 154(b) by 298 days.

(21) Appl. No.: 17/707,441

(22) Filed: Mar. 29, 2022

(65) Prior Publication Data

US 2022/0330217 A1 Oct. 13, 2022

Related U.S. Application Data

(63) Continuation of application No. PCT/CN2019/109596, filed on Sep. 30, 2019.

(51) Int. Cl.
- *H04L 5/00* (2006.01)
- *H04L 1/00* (2006.01)
- *H04W 72/04* (2023.01)
- *H04W 72/044* (2023.01)

(52) U.S. Cl.
CPC ......... *H04W 72/044* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 10,038,544 B2* | 7/2018 | Zeng | ............ H04L 5/14 |
| 11,026,252 B2 | 6/2021 | Tang et al. | |
| 11,259,290 B2 | 2/2022 | Park | |
| 11,483,825 B2* | 10/2022 | Chen | ............ H04L 5/0094 |

(Continued)

FOREIGN PATENT DOCUMENTS

| | | |
|---|---|---|
| CN | 109217989 A | 1/2019 |
| CN | 109891785 A | 6/2019 |

(Continued)

OTHER PUBLICATIONS

Indian First Examination Report issued in IN Patent Application No. 202247020561, dated Mar. 26, 2024, 6 pages.

(Continued)

*Primary Examiner* — Sai Aung
(74) *Attorney, Agent, or Firm* — Perkins Coie LLP

(57) ABSTRACT

Apparatuses, methods, systems, and computer readable media are disclosed. In one aspect, a wireless communications method is disclosed. The method includes receiving, at a wireless terminal from a network node, an uplink cancellation indication. The method further includes determining, at the wireless terminal, an allocation of a reference uplink resources comprising a plurality of uplink time-frequency resources; and determining, by the wireless terminal, one or more of the plurality of uplink time-frequency resources to cancel according to the uplink cancellation indication. The method further includes cancelling, by the wireless terminal based on the uplink cancellation indication, an uplink transmission on the determined one or more of the plurality of uplink time-frequency resources.

23 Claims, 11 Drawing Sheets

(56) References Cited

U.S. PATENT DOCUMENTS

| | | | |
|---|---|---|---|
| 11,523,414 | B2 | 12/2022 | Choi et al. |
| 11,924,682 | B2* | 3/2024 | Xia ................. H04L 1/1854 |
| 2018/0123625 | A1* | 5/2018 | Lee ................. H04B 15/02 |
| 2019/0254081 | A1 | 8/2019 | Li et al. |
| 2020/0137782 | A1 | 4/2020 | Su et al. |
| 2021/0120442 | A1* | 4/2021 | Hao ................. H04W 24/10 |
| 2022/0039100 | A1* | 2/2022 | Yoshioka ............ H04W 72/543 |
| 2022/0394739 | A1 | 12/2022 | Choi et al. |
| 2024/0129895 | A1* | 4/2024 | Rune ................. H04W 36/08 |

FOREIGN PATENT DOCUMENTS

| | | |
|---|---|---|
| WO | 2017194822 A1 | 11/2017 |
| WO | 2019032844 A1 | 2/2019 |
| WO | 2019139446 A1 | 7/2019 |
| WO | 2019160332 A1 | 8/2019 |

OTHER PUBLICATIONS

European Search Report issued in EP Patent Application No. 19947909.8, dated Apr. 26, 2023, 14 pages.
Zte et al., "UL multiplexing of transmissions with different reliability requirements," 3GPP TSG RAN WG1 Meeting #92bis, R1-1803803, Sanya, China, Apr. 16-20, 2018, 6 pages.
International Search Report and Written Opinion mailed on Jun. 30, 2020 for International Application No. PCT/CN2019/109596, filed on Sep. 30, 2019 (7 pages).
Vivo, "UL inter-UE Tx prioritization for URLLC", 3GPP TSG RAN WG1 #97, Reno, USA, R1-1906150, 13 pages, May 13-17, 2019.
Fujitsu, "Discussion on UL cancellation indication", 3GPP TSG RAN WG1 #97, Reno, USA, R1-1906585, 4 pages, May 13-17, 2019.
Chinese office action issued in CN Patent Application No. 201980102638.7, dated Jul. 16, 2024, 25 pages. English translation included.

* cited by examiner

```
┌─────────────────────────────────────────────────────────────────┐
│ Receiving, at a wireless terminal from a network node, an uplink cancellation │ ─ 1010
│                              indication                                       │
└─────────────────────────────────────────────────────────────────┘
                                     │
┌─────────────────────────────────────────────────────────────────┐
│ Determining, at the wireless terminal, an allocation of a reference uplink    │ ─ 1020
│        resource comprising a plurality of uplink time-frequency resources     │
└─────────────────────────────────────────────────────────────────┘
                                     │
┌─────────────────────────────────────────────────────────────────┐
│ Determining, by the wireless terminal, one or more of the plurality of uplink │ ─ 1030
│    time-frequency resources to cancel according to the uplink cancellation    │
│                              indication                                       │
└─────────────────────────────────────────────────────────────────┘
                                     │
┌─────────────────────────────────────────────────────────────────┐
│ Cancelling, by the wireless terminal based on the uplink cancellation indication, │ ─ 1040
│ an uplink transmission on the determined one or more of the plurality of uplink   │
│                         time-frequency resources                                  │
└─────────────────────────────────────────────────────────────────┘
```

FIG. 10

TIME-FREQUENCY BLOCK CANCELLATION

CROSS-REFERENCE TO RELATED APPLICATIONS

This application is a continuation of International Patent Application No. PCT/CN2019/109596, filed on Sep. 30, 2019, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Apparatuses, methods, systems, and computer readable media are disclosed. In one aspect, a wireless communications method is disclosed. The method includes receiving, at a wireless terminal from a network node, an uplink cancellation indication. The method further includes determining, at the wireless terminal, an allocation of a reference uplink resources comprising a plurality of uplink time-frequency resources; and determining, by the wireless terminal, one or more of the plurality of uplink time-frequency resources to cancel according to the uplink cancellation indication. The method further includes cancelling, by the wireless terminal based on the uplink cancellation indication, an uplink transmission on the determined one or more of the plurality of uplink time-frequency resources.

In another aspect, wireless communications method includes determining, by a network node, one or more of a plurality of uplink time-frequency resources to cancel. The method further includes sending, from the network node to a wireless terminal, an uplink cancellation indication.

The above and other aspects and their implementations are described in greater detail in the drawings, the descriptions, and the claims.

BRIEF DESCRIPTION OF THE DRAWING

FIG. 3 depicts a two-dimensional (2D) bitmap representing a time-frequency resource, in accordance with some example embodiments.

FIG. 10 depicts a process, in accordance with some example embodiments.

DETAILED DESCRIPTION

Figure 1:
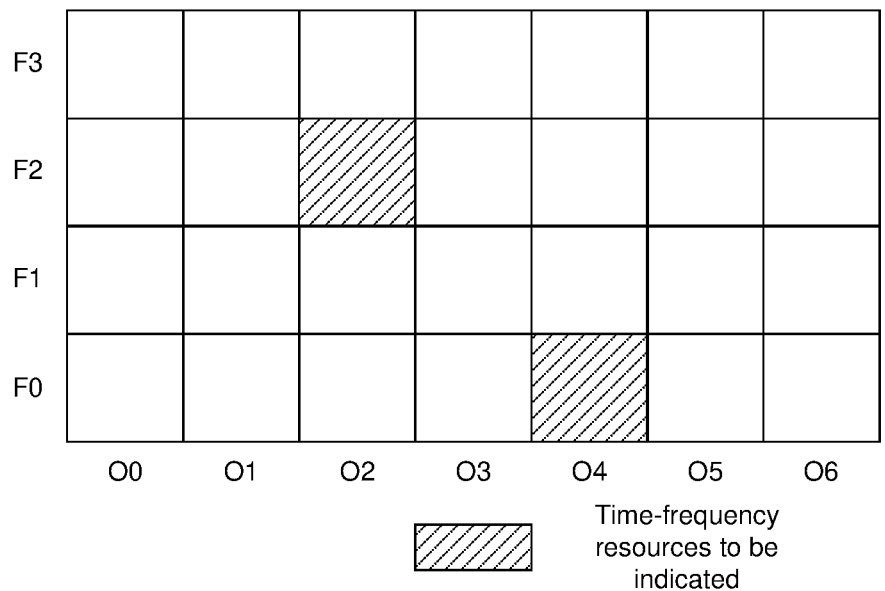
FIG. 1 depicts an example of a time-frequency domain resources divided into seven time blocks and four frequency blocks corresponding to an example reference uplink resource (RUR), in accordance with some example embodiments.

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The 5th generation (5G) mobile communication system enables a variety of application scenarios, including Enhanced Mobile Broadband (eMBB), Ultra-Reliable Low Latency Communication (URLLC), and Massive Machine Type of Communication(mMTC) etc.

For URLLC used in industry automation, intellectual transport, remote control, smart grid, and virtual reality, there are often very stringent requirements on end-to-end latency, e.g., 1 ms or 0.5 ms. To meet such a requirement, the network node needs to schedule resources for transmission in time when traffic arrives. However, the user equipment (UE) or wireless device may have another on-going physical channel for eMBB traffic for transmission or reception. In these cases, the processing timeline for the two channels of traffic may overlap while the UE may have no ability to simultaneously process for transmission or reception the two overlapping channels at a given serving cell.

In order to ensure the ultra-high reliability of the URLLC service and the ultra-low latency of the transmission, when a URLLC uplink service receives data, the data needs to be sent on allocated transmission resources as quickly as possible, but the resources may have been previously allocated to other uplink services (such as eMBB uplink service). When the URLLC service preempts part of the allocated resources for transmission, the base station sends downlink control information (DCI) to the user equipment (UE) that is cancelled, and the UE determines the uplink cancellation indication information through the DCI (uplink). An uplink cancellation indication (UL CI), which in turn determines the resources that are cancelled. Disclosed are a plurality of indication methods to indicate a reference uplink resource (RUR) which is divided into time-frequency resource blocks. Each time-frequency resource block of the RUR is indicated in a 2D bitmap or is a 1D bitmap in the time domain. A 1D bitmap may be configured in the frequency domain to indicate that the time-frequency 2D resource is occupied by the bitmap, or a 1D bitmap is configured for the time domain of the RUR, and the frequency domain resource is indicated according to the occupation of the time domain resource. URLLC services have deficiencies in certain arrival scenarios. In addition, when there are UEs with different processing capabilities in a cell, the understanding of the RUR by the UEs with different capabilities may be inconsistent.

When the communication system instructs the URLLC service to preempt other services with lower delay requirements, currently the resource indication method cannot be flexibly selected, and UEs with different processing capabilities cannot determine the RUR.

INTRODUCTION

The technical problem to be solved is to overcome the problem of indicating resources including reference uplink resources (RUR) and cancelled uplink resources and adjusting cancelled uplink resources across different UEs with different capabilities.

In accordance with some example embodiments, when the UE receives the DCI sent by the base station, the UE cancels the uplink transmission on the corresponding resource in the RUR according to the UL CI of the DCI bearer.

In some example embodiments, there are N types of candidate resource indication methods that indicate an RUR and cancelled resources. See, for example Examples 1 and 2 below. Described below are various indicating methods including:

1) Explicitly distinguishing the N indication methods using distinguishing bits;
2) Scrambling the Cyclic Redundancy Check (CRC) bits of the DCI by different Radio Network Temporary Identifiers (RNTIs) thereby distinguishing the N indication methods;
3) The N indication methods are implicitly distinguished by configuring different search spaces (SS) for the DCI.

The candidate resource indication methods further include: 1) the time domain of the time-frequency resource is indicated by a 1D bitmap, the frequency domain of the time-frequency resource is indicated by a 1D bitmap; 2) the time domain of the time-frequency resource is indicated by a SLIV, The frequency domain of the time-frequency resource is indicated by the SLIV; 3) the time-frequency resource is indicated by the 2D bitmap; 4) the time domain of the time-frequency resource is indicated by the 1D bitmap, and the time domain occasion indication indicated by the time domain 1D bitmap In the case, the time-frequency resource corresponding to the time domain occasion is indicated by the 2D bitmap; 5) the time domain of the time-frequency resource is indicated by the 1D bitmap, the frequency domain of the time-frequency resource is indicated by the SLIV; 6) the time-frequency The time domain of the resource is indicated by the SLIV, and the frequency domain of the time-frequency resource is indicated by the 1D bitmap.

Another method of indicating the candidate is as follows (see, for example, Example 3 below): The time domain of the time-frequency resource is indicated by the 1D bitmap, and the time-frequency resource corresponding to the time domain occasion is indicated by the 2D bitmap according to the time domain indication indicated by the time domain 1D bitmap. Further, the time domain 1D bitmap may determine the number of occasions, m, indicated in the RUR. The remaining time-frequency indication resource is determined according to the m-value and the time-frequency indication total cost Q, and the 2D bitmap is further determined according to the remaining time-frequency resource to indicate the time-frequency resource corresponding to the indicated time domain occasion.

In some example embodiments, the base station sends a DCI to the UE, the DCI carries the UL CI, and the UE cancels the uplink transmission based on the UL CI. The UE includes a first UE with weak signaling processing capability and a second UE with strong signaling processing capability, and the DCI decoding is completed after the first UE X1 time domain symbols are predefined. X2 time domain symbols complete DCI decoding, and X1 N, X2 N. The value of N is a UE capability standard predefined by the protocol The DCI sent by the base station to the UE includes the first DCI and the second DCI, the first UE can receive the first DCI and the second DCI, and the second UE can receive the first DCI and the second DCI. See, for example, Example 4 below.

In some example embodiments, two methods for the first UE to determine the RUR and update the CI indication information include the following:

Method 1: The first UE determines the starting time of the RUR according to the location where the first DCI transmission ends. At this time, the resource indication information of the first UE is updated to the first UL CI, and the uplink transmission in the first RUR is cancelled according to the first UL CI to ensure transmission of the higher priority service.

Method 2: The first UE determines the starting time of the RUR according to the location where the second DCI transmission ends. At this time, the resource indication information of the first UE is updated according to the second UL CI. Specifically, the information indicating the third RUR in the first UE is updated to the information indicating the third RUR in the second UL CI.

In some example embodiments, two methods for the second UE to determine the RUR and update the CI indication information include:

Method 1: The second UE determines the starting time of the RUR according to the location where the first DCI transmission ends. At this time, the resource indication information of the second UE is updated to the first UL CI, and the uplink transmission in the first RUR is cancelled according to the first UL CI to ensure the transmission of the higher priority service.

Method 2: The second UE determines the starting time of the RUR according to the location where the second DCI transmission ends. At this time, the resource indication information of the second UE is updated according to the second UL CI, and specifically, the information indicating the third RUR in the second UE is updated to the information corresponding to the third RUR in the second UL CI.

The DCI sent by the base station to the UE includes the first DCI and the second DCI. The first UE can only receive the first DCI, and the second UE can only receive the second DCI. See, for example, Example 5 below.

In some example embodiment, a method for determining the RUR and updating the CI indication information by the first UE is as follows:

The first UE determines the starting time of the RUR according to the location where the first DCI transmission ends. At this time, the resource indication information of the first UE is updated to the first UL CI, and the uplink transmission in the first RUR is cancelled according to the first UL CI to ensure transmission of the higher priority service.

There are two methods for the second UE to determine the RUR and update the CI indication information including:

The second UE determines the starting time of the RUR according to the location where the second DCI transmission ends. At this time, the resource indication information of the second UE is updated to the second UL CI, and the uplink transmission in the second RUR is cancelled according to the second UL CI to ensure transmission of the higher priority service.

The base station sends a DCI to the UE, where the first UE and the second UE can receive the DCI, and the UL CI of the DCI bearer is the sum of the first UL CI and the second UL CI. set. The first UL CI indicates a resource that the first UE is preempted, and the second UL CI indicates a resource that the second UE is preempted. See also, Example 6 below.

In some example embodiment, a method for determining the RUR by the first UE is as follows:

The first UE determines the start of the RUR based on the location at which the DCI transmission ends. At this time, the first UE can cancel its own transmission in the first RUR to ensure the transmission of higher priority services.

In some example embodiment, a method for determining the RUR by the second UE is as follows:

The second UE determines the start of the RUR based on the location at which the DCI transmission ends. At this time, the second UE can cancel its own transmission in the second RUR to ensure the transmission of higher priority services.

EXAMPLE EMBODIMENTS

Example 1

In this embodiment, a method for a base station to select a resource indication method by distinguishing domains is described below.

Figure 2:
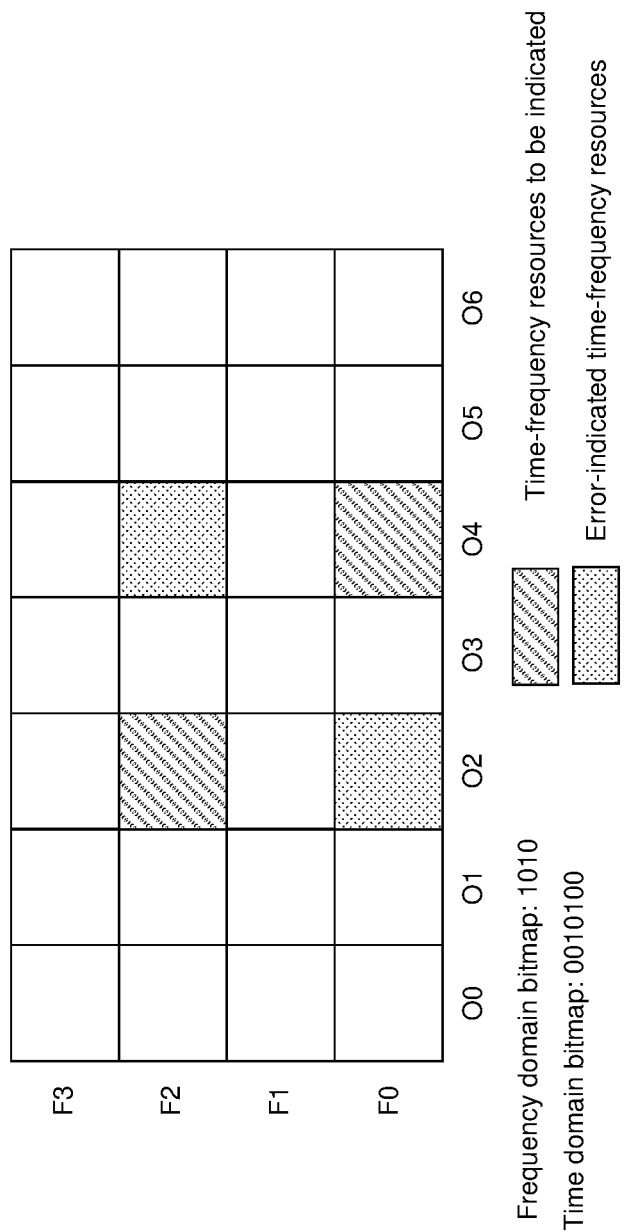
FIG. 2 depicts an example of a one-dimensional (1D) bitmap representing a time-frequency resource, in accordance with some example embodiments.

In this embodiment, the time-frequency resource region to be indicated is referred to as RUR. The RUR is preferably one or more physical resource blocks (RBs) or one or more physical resource block groups (RBGs) in the frequency domain and is determined by a predefined or semi-static configuration method. The RUR is greater than or equal to the monitoring interval of the resource indication signaling in the time domain and is determined by a predefined or semi-static configuration method. The RUR is divided into a plurality of time domain occasion, and each occasion is one or more time domain symbols. For example, as shown in FIG. 1, the RUR is divided into seven time domain occasion in the time domain, the real-time domain size is 7, and the part bandwidth (BWP) in the frequency domain is divided into four parts, that is, the frequency domain size. For example, the time-frequency resources to be indicated are time-frequency resource blocks indicated by (O2, F2) and (O4, F0). The candidate indication method of the RUR includes at least the following six methods:

Method 1: The time domain of the time-frequency resource is indicated by 1D bitmap $A_{1 \times M}$, and M is a time domain size. The frequency domain of the time-frequency resource is indicated by a 1D bitmap $B_{1 \times N}$, and N is a frequency domain size. The 1D bitmap is determined by a predefined or higher layer signaling configuration or a physical layer signaling indication. As shown in FIG. 2, the indication resource is exemplified in FIG. 1, M=7, N=4, then $A_{1 \times M}$=(0010100), $B_{1 \times N}$=(1010). When a value in 1D bitmap is 1, it means that the time domain or frequency domain is indicated. And when the value of 1D bitmap is 0, it means that the time domain or frequency domain is not indicated.

Method 2: The time domain of the time-frequency resource is indicated by a start and length indicator value (SLIV), and the frequency domain of the time-frequency resource is indicated by SLIV. The SLIV indication method is that the SLIV value represents the starting position and duration of the resource. The SLIV is determined by a predefined or higher layer signaling configuration or a physical layer signaling indication.

Figure 3:
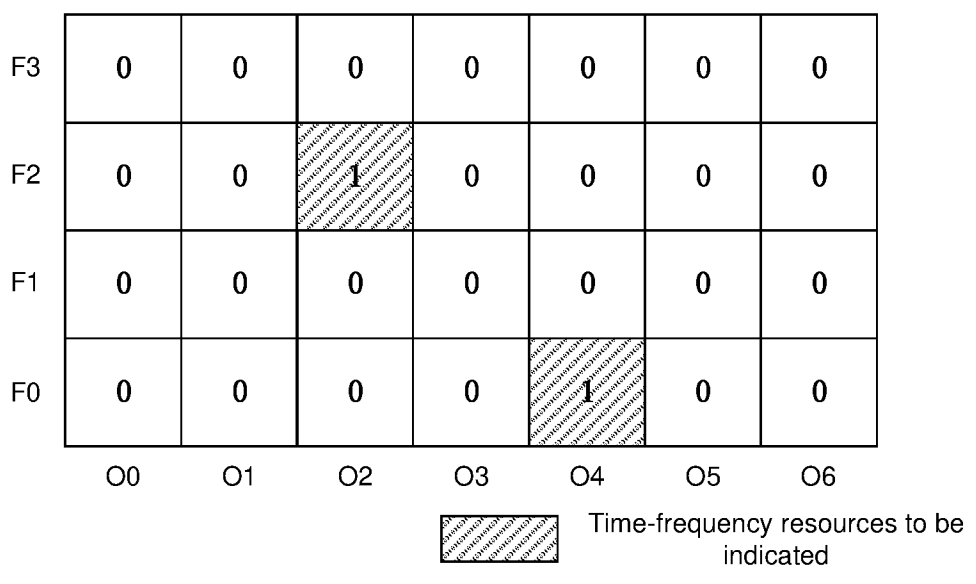

Method 3: Predetermine a time-frequency pattern of the time-frequency resource. The time-frequency pattern is divided into a plurality of time-frequency resource blocks and is indicated by a 2D bitmap $C_{M \times N}$, where M is a time domain size of the 2D bitmap, and N is a frequency domain size of the 2D bitmap. The 2D bitmap is determined by a predefined or higher layer signaling configuration or a physical layer signaling indication. As shown in FIG. 3, M=7, N=4, then $$C_{M \times N} = \begin{pmatrix} 0,0,0,0,0,0,0 \\ 0,0,1,0,0,0,0 \\ 0,0,0,0,0,0,0 \\ 0,0,0,0,1,0,0 \end{pmatrix}, \quad \text{Equation 1}$$

When the value of 2-D bitmap is 1, the time-frequency resources are indicated. And when the value of 2-D bitmap is 0, the resource in time-frequency domain is not indicated.

Figure 4:
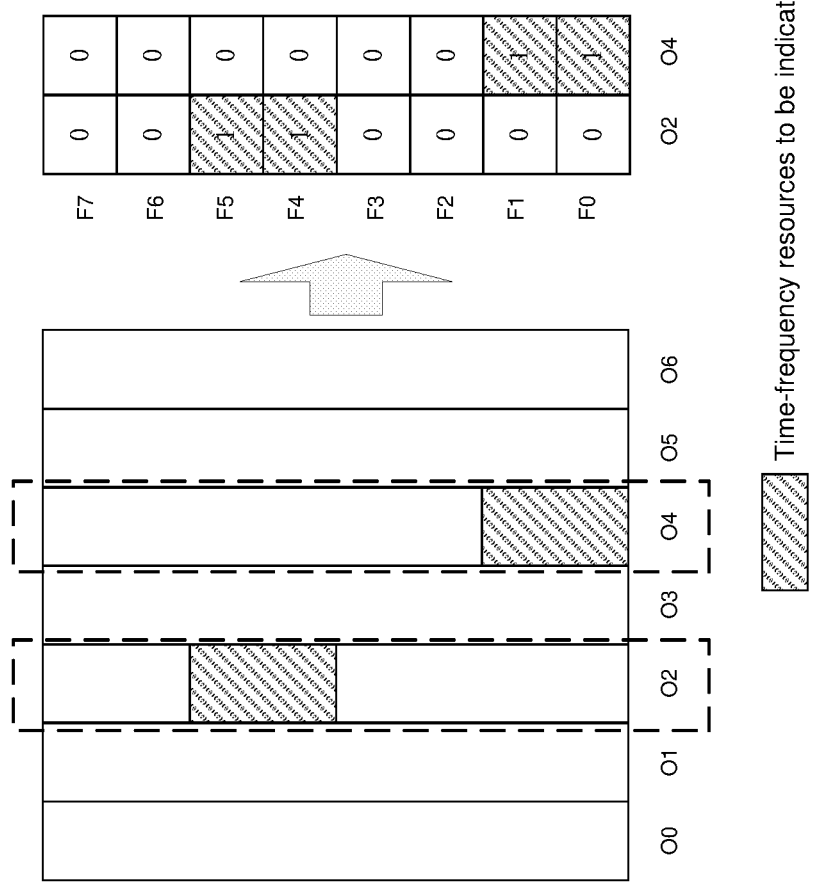
FIG. 4 depicts an example of a 2D time-frequency bitmap according to a time domain 1D bitmap, in accordance with some example embodiments.

Method 4: The time domain of the time-frequency resource is indicated by 1D bitmap $A_{1 \times M}$, and M is a time domain size. According to the time domain 1D bitmap, if m time domain occasions are indicated, the time-frequency resource corresponding to the time domain occasion is indicated by 2D bitmap $C_{m \times N}$, and N is the frequency domain size in the 2D bitmap, which is determined by a predefined or higher layer signaling configuration or a physical layer signaling indication, or is determined according to the remaining indication resource q=Q−M, where the Q is the total cost of the time-frequency indication. As shown in FIG. 4, M=7, m=2, N=8, then $A_{1 \times M}$=(0010100) can be configured.

$$C_{m \times N} = \begin{pmatrix} 0,0 \\ 0,0 \\ 1,0 \\ 1,0 \\ 0,0 \\ 0,0 \\ 0,1 \\ 0,1 \end{pmatrix}, \quad \text{Equation 2}$$

A value of 1 for 1D bitmap and 2D bitmap indicates that the resource is indicated, and 0 indicates that the resource is not indicated.

Method 5: The time domain of the time-frequency resource is indicated by 1D bitmap $A_{1 \times M}$, and M is a time domain size. The frequency domain of the time-frequency resource is indicated by SLIV. The SLIV indication method is that the SLIV value represents the starting position and duration of the resource. The 1D bitmap and the SLIV are indicated by physical layer signaling or configured by high layer signaling.

Method 6: The time domain of the time-frequency resource is indicated by SLIV, and the SLIV indication method is that the SLIV value represents the starting position and the duration of the resource. The frequency domain of the time-frequency resource is indicated by a 1D bitmap $B_{1 \times N}$, and N is a frequency domain size. The 1D bitmap and the SLIV are indicated by physical layer signaling or configured by high layer signaling.

The indication methods of the candidate are not limited to the above six indication methods.

The two indication methods are selected from the above six candidate methods or other indication methods by pre-defined or high layer signaling configuration, and are recorded as method A and method B. The base station determines one of the method A and the method B as the RUR indication method, and the method for determining the RUR indication method by the base station includes at least one of the following:

Method 1: Explicitly distinguish between two indication methods by 1 bit. The base station introduces a distinguishing domain, which contains 1 bit of distinguishing bits. When the discrimination bit value is 0, the method A is selected as the indication method of the RUR, and when the discrimination bit value is 1, the method B is selected as the indication method of the RUR.

The distinguishing bit may be indicated by physical layer signaling or configured by high layer signaling. Specifically, the distinguishing bit value is set according to the situation actually occupied by the time domain occasion in the RUR. Pre-defined or high layer signaling configures a threshold L, L≤M. When the actual occupied time domain occasion number m>L, the distinguishing bit is set to 0, when the actual occupied time domain occasion number m<L, the distinguishing bit is set to 1; or when m>L, the distinguishing bit is set to 0, when m<L, Then the distinguishing bit is set to 1.

In this embodiment, it is assumed that the candidate indication method 1 is the method A and the candidate indication method 3 is the method B. The RUR takes the definition in FIG. 1 as an example. As shown in Table 1, the method 1 and the method 3 indicate the frequency domain granularity statistics in the case where the actual time domain occasion occupation number is different. The setting of L follows the principle of making the frequency domain granularity indicated by the selected indication method finer, and L is set to 5. When L<5, method B is selected, and when L>5, method A is selected. When L=5, you can choose either method.

Method 2: Scrambling the CRC bits of the DCI by different RNTIs implicitly distinguishes the two indication methods. The base station divides the multiple RNTIs into two groups of A and B by means of pre-defined or high layer signaling configuration, and each group of RNTIs includes at least one RNTI. If the UE receives the DCI scrambled by the A group RNTI, it determines the method A as the indication method of the RUR. If the UE receives the DCI scrambled by the B group RNTI, it determines the method B as the indication method of the RUR.

Method 3: Configure different SS implicit indications by high layer signaling. The high layer signaling configures two types SS A and B for the DCI. The UE blindly checks the DCI in the two types SS. If the DC is detected in A SS, the method A is selected as the indication method of the RUR. If the DC is detected in B SS, the method B is selected as the indication method of the RUR.

The base station can flexibly select an indication method for indicating the RUR according to the distinguishing domain, which is beneficial to indicating the full utilization of the resource, and fully exploiting the advantages of the indication method to further reduce the error indication and refine the frequency domain indication.

TABLE 1

| Selected indication method | Distingish between bits | m | Time-frequency indication overhead ($Q_B = M + m*N$, $Q_A = M*N$) | Minimum frequency domain indication granularity (BWP) |
|---|---|---|---|---|
| B | 0 | 1 | 28 = 7 + 1*21 | 1/21 |
| B | 0 | 2 | 27 = 7 + 2*10 | 1/10 |
| B | 0 | 3 | 28 = 7 + 3*7 | 1/7 |
| B | 0 | 4 | 27 = 7 + 4*5 | 1/5 |
| A/B | 0/1 | 5 | 28 = 7*4/27 = 7 + 5*4 | 1/4 |
| A | 1 | 6 | 28 = 7*4 | 1/4 |
| A | 1 | 7 | 28 = 7*4 | 1/4 |

Example 2

In this embodiment, a method for a base station to select a resource indication method by distinguishing domains is described.

In this embodiment, the RUR is preferably one or more RBs or one or more RBGs in the frequency domain and is determined by a predefined or semi-static configuration method. The RUR is greater than or equal to the monitoring interval of the resource indication signaling in the time domain and is determined by a predefined or semi-static configuration method. The RUR is divided into multiple time domain occasion, and each occasion is one or more time domains. symbol. The candidate indication method of the RUR includes the six indication methods described in Example 1 and other indication methods.

The method A, method B, and method C are selected from the six candidate methods or other methods described in Example 1 by a method of pre-defined or high layer signaling configuration. The base station selects one of the foregoing three methods as the RUR indication method according to the distinguishing domain, and the method for distinguishing the method A and the method B by the base station includes at least one of the following:

Method 1: Explicitly distinguish three indication methods by 2 bits. The base station introduces a distinguishing domain, which contains 2 distinguishing bits. For example, when the bit value is 00, method A may be selected as the RUR indication method, and when the bit value is 01 the method B may be selected as the RUR indication method, and when the bit value is 11, the method C may be selected as the RUR indication method.

The distinguishing bit may be indicated by physical layer signaling or configured by high layer signaling. Specifically, the distinguishing bit value is set according to the situation actually occupied by the time domain occasion in the RUR. The predefined or high layer signaling configures two thresholds L1 and L2, L1<L2 and L2≤M. When the actually occupied time domain occasion number m≤L1, the distinguishing bit is set to 00, when L1<m≤L2 then the distinguishing bit is set to 01, when m>L2, the distinguishing bit is set to 10; or when m<L1, Then the distinguishing bit is set to 00, when L1≤m<L2, the distinguishing bit is set to 01, and when m≥L2, the distinguishing bit is set to 10.

Method 2: Scrambling the CRC bits of the DCI by different RNTIs implicitly distinguishes the three indication methods. The RNTI is divided into three groups of A, B, and C by means of a predefined or high layer signaling configuration, and each group of RNTIs includes at least one RNTI. The UE receives the DCI scrambled by the A group RNTI and determines the selection method A as the indication method of the RUR. If the UE receives the DCI scrambled by the B group RNTI, it determines the selection method B as the indication method of the RUR. The UE receives the DCI scrambled by the C group RNTI and determines the selection method C as the indication method of the RUR.

Method 3: Configure different SS implicit indications by high layer signaling. The high layer signaling configures three types SS A, B, and C for DCI. The UE blindly checks the DCI in the SS. If the DCI is detected in A SS, the method A is selected as the indication method of the RUR. If the DCI is detected in B SS, the method B is selected as the indication method of the RUR. And if the DCI is detected in C SS, the method C is selected as the indication method of the RUR.

The foregoing implementation can also extend the selection of P indication methods, P. For the foregoing method 1, the pre-defined or RRC signaling configures P−1 thresholds $L_i (i=1, \ldots, P-1)$, the distinguishing bit is $\lceil \log_2 P \rceil$ bit, and at least indicates P states; for the foregoing method 2, the base station divides multiple RNTIs into a predefined or higher layer signaling configuration manner. In the P group, the P state is indicated. For the foregoing method 3, the high layer signaling configures P-type SS for DCI, and the UE blindly checks the DCI in the P-configured SS to indicate the P-state.

The base station can flexibly select an indication method for indicating the RUR according to the distinguishing domain, which is beneficial to indicating the full utilization of the resource, and fully exploiting the advantages of the indication method to further reduce the error indication and refine the frequency domain indication.

Example 3

This embodiment includes a method for a base station to indicate time-frequency resource occupation to a terminal by using a differentiated domain selection resource indication method is described.

In this embodiment, the RUR is preferably one or more RBs or one or more RBGs in the frequency domain and is determined by a predefined or semi-static configuration method. The RUR is greater than or equal to the monitoring interval of the resource indication signaling in the time domain and is determined by a predefined or semi-static configuration method. The RUR is divided into M time domain occasion, and each occasion is one or more time domains. symbol. The candidate indication method 4 in Embodiment 1 determines the number of occasions indicated in the RUR by the time domain 1D bitmap. Determining the remaining time-frequency indication resource according to the m-value and the time-frequency indication total cost Q and determining a 2D bitmap indicating the time-frequency resource corresponding to the indicated time domain occasion. Specifically, the method for determining a 2D bitmap mainly has the following two methods:

Method 1: The time domain size of the 2D bitmap is equal to m, and the frequency domain size N of the 2D bitmap is indicated by a predefined or higher layer signaling configuration or indicated by physical layer signaling. For example, when m=1, N can be pre-defined or high layer signaling configuration or physical layer signaling indicates 16, when m=2, N can be pre-defined or high layer signaling configuration or physical layer signaling indicates 8.

Method 2: The total resource overhead indicated by the time-frequency resource is set to Q by pre-defined or physical layer or higher layer signaling, and the bit resource available for the 2D bitmap is q=Q−M, and the number of indicated occasion is determined according to the 1D bitmap. To ensure that the frequency domain granularity corresponding to each indicated time domain occasion is consistent, the method for determining the frequency domain size N of the 2D bitmap includes at least one of the following cases:

(a) When q can be divisible by n, q≥m, and the time domain size of the 2D bitmap is m, the frequency domain size N of the 2D bitmap is $$N = \frac{q}{m};$$

(b) When q cannot be divisible by m, q>m, and the time domain size of the 2D bitmap is m, the frequency domain size N of the 2D bitmap is $$N = \left\lfloor \frac{q}{m} \right\rfloor;$$

(c) Set the occupancy ignoring parameter k(k<m), update the indicated number of occasions to m−k, that is, the time domain size of the 2D bitmap is m−k, and then determine the frequency domain size of the 2D bitmap $$N = \left\lfloor \frac{q}{m-k} \right\rfloor$$

according to the method (a)(b). The parameter k can be determined by predefined methods, or indicated by physical layer indication or configured by high layer signaling.

In this embodiment, it is possible to determine the 2D bitmap of the time frequency resource corresponding to the indicated time domain, and the base station can be flexible in dividing the frequency domain indication granularity for the time domain, which facilitates the refinement of the frequency domain resources.

Example 4

The schemes described in Examples 1-3 may be established on the basis that the RUR has been determined. In this embodiment, a method for determining the RUR based on the UE capability and updating the resource indication information is described.

In this embodiment, the base station sends the first DCI and the second DCI, where the first DCI carries the first UL CI, and the second DCI carries the second UL CI. Specifically, the first UL CI indicates a first RUR resource occupation, and the second UL CI indicates a second RUR resource occupation. The first UE and the second UE may have uplink transmission. The signaling processing capability of the first UE is weaker, and when the first UE receives DCI, the UE completes DCI decoding and resource cancellation after X1 time domain symbols. The signaling processing capability of the second UE is stronger, and when the second UE receives DCI, the UE completes DCI decoding and resource cancellation after X2 time domain symbols. X1≥W, X2≤W. The W is a UE capability standard predefined by the protocol. The first UE can receive the first DCI and the second DCI, and the second UE can receive the first DCI and the second DCI.

There are two methods for the first UE to determine the RUR and update the CI indication information as follows:

Method 1: The first UE determines a starting time of the RUR according to the time when the first UE receives the first DCI. The starting time of a first RUR is X1 symbols after the end time domain symbol of the first DCI, and X1 W. The length of the first RUR is determined by a predefined or higher layer signaling configuration or a physical layer signaling indication. At this time, the resource indication information of the first UE is updated to the first UL CI, and the uplink transmission in the first RUR is cancelled according to the resource indication information to ensure transmission of the higher priority.

Method 2: The first UE determines a starting time of the RUR according to the time when the first UE receives the second DCI. The starting time of a second RUR is X2 symbols after the end time domain symbol of the first DCI, and X2≤W. The length of the second RUR is determined by a predefined or higher layer signaling configuration or physical layer signaling indication. At this time, the resource indication information of the first UE is updated according to the second UL CI. Specifically, the information indicating the third RUR in the first UE is updated to the information corresponding to the third RUR in the second UL CI. The starting time of the third RUR is X1 symbols after the last time domain symbol of the second DCI. When the last symbol of the first RUR is before the last symbol of the second RUR, the last symbol of the third RUR is the last symbol of the first RUR end point, and when the last symbol of the second RUR is before the last symbol of the first RUR, the third RUR end point is equal to the last symbol of the second RUR.

Figure 5:
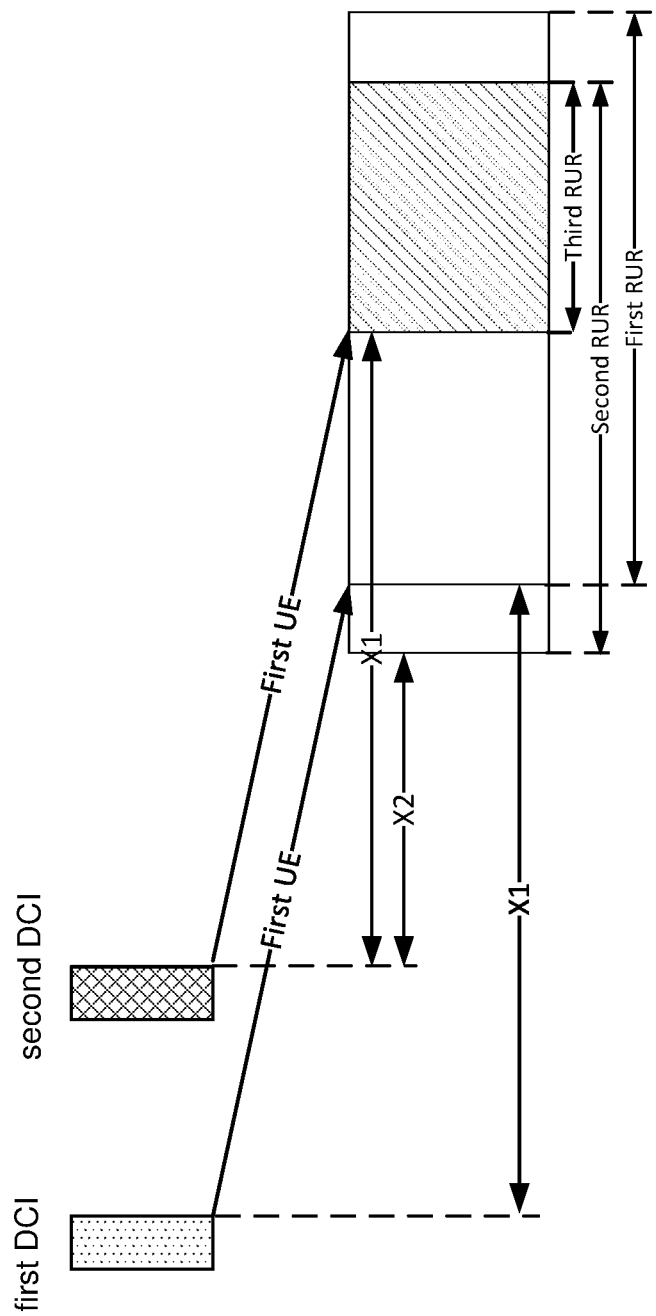
FIG. 5 depicts an example diagram of a UE with weak processing capability determining a RUR, in accordance with some example embodiments.

Further, as shown in FIG. 5, when the first UE receives the first DCI and the second DCI, and the first DCI arrives before the second DCI, the first UE first determines the resource indication information according to the first UL CI. The resource indication information is then updated according to the second UL CI, wherein the updated portion is the information indicating the third RUR. Assume that the length of the first RUR and the second RUR is seven time domain occasions, the length of the third RUR is 3 time domain occasions. The time domain bitmap of the first UL CI is 0100100, wherein 4-6 bits indicate the third RUR, and the time domain indication bitmap of the second UL CI is 0000111, and the last three bits indicate the third RUR. After receiving the second UL CI, the first UE updates the indication information of the third RUR, and retains the indication information of other resources, and finally obtains a new UL CI 0101110. The font bold and underlined portion is the indication of the third RUR.

There are two methods for the second UE to determine the RUR and update the CI indication information including:

Method 1: The second UE determines the starting time of the RUR according to the time when the second UE receives the first DCI. The starting time of a first RUR is X1 symbols after the end time domain symbol of the first DCI, and X1≥W. The length of the first RUR is determined by a predefined or higher layer signaling configuration or a physical layer signaling indication. At this time, the resource indication information of the second UE is updated to the first UL CI, and the uplink transmission in the first RUR is cancelled according to the resource indication information to ensure the transmission of the higher priority.

Method 2: The second UE determines the starting time of the RUR according to the time when the second UE can receives the second DCI. The starting time of a second RUR is X2 symbols after the end time domain symbol of the second DCI, and X2≤W. The length of the second RUR is determined by a predefined or higher layer signaling configuration or physical layer signaling indication. At this time, the resource indication information of the second UE is updated according to the second UL CI, and specifically, the information indicating the third RUR in the second UE is updated to the information corresponding to the third RUR in the second UL CI. When the starting time of the first RUR is after the second RUR starting time, the starting time of the third RUR is the first RUR starting time, and when the starting time of the second RUR is after the starting time of the first RUR, the third RUR starting time is the second RUR starting time. When the last time domain symbol of the first RUR is after the last time domain symbol of the second RUR, the ast time domain symbol of the third RUR is the last time domain symbol of the second RUR, and when the last time domain symbol of the second RUR is after the last time domain symbol of the first RUR, the last time domain symbol of third RUR is the last time domain symbol of the first RUR.

Figure 6:
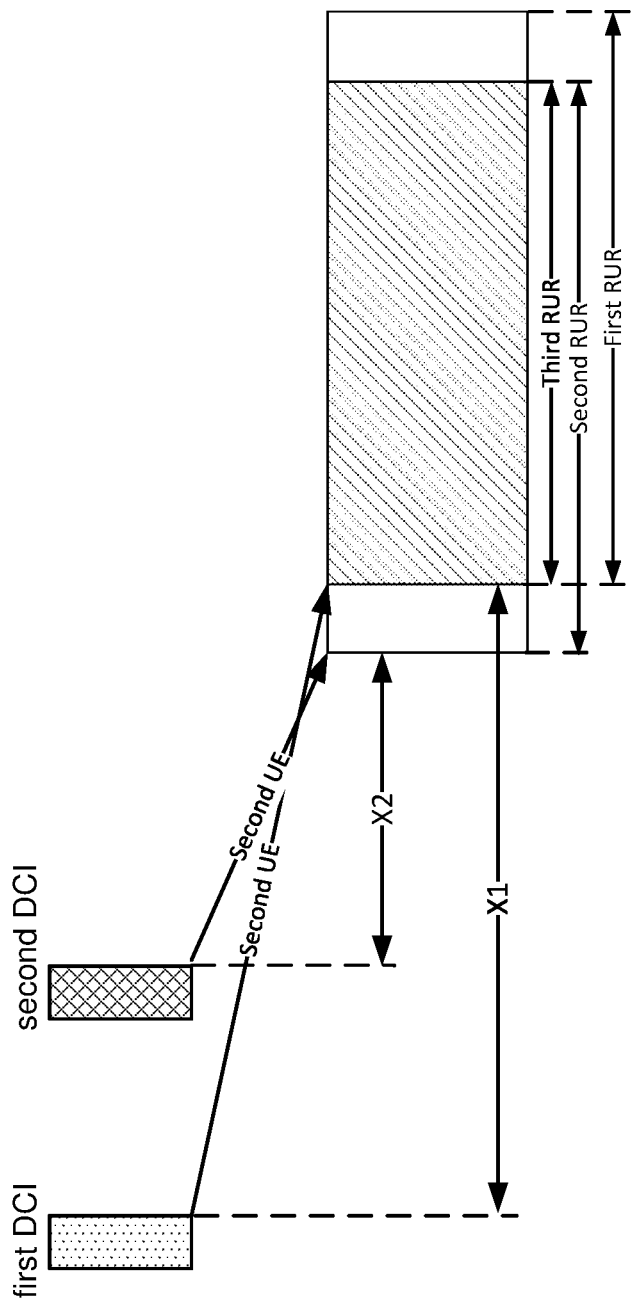
FIG. 6 depicts an example diagram of a UE with strong processing capability determining a RUR, in accordance with some example embodiments.

Further, as shown in FIG. 6, when the second UE receives the first DCI and the second DCI, and the first DCI arrives before the second DCI, the second UE first determines the resource indication information according to the first UL CI. The resource indication information is then updated according to the second UL CI, wherein the updated portion is information indicating the third RUR. Assume that the length of the first RUR and the second RUR is seven time domain occasions, the length of the third RUR is 6 time domain occasions, and the time domain bitmap of the first UL CI is 0000000, where 1-6 bits indicate the third RUR, and the time domain bitmap of the second UL CIs is 1110111, where 2-7 bits indicate the third RUR. The indication information of the third RUR is updated, and the indication information of other resources is reserved, and finally the new 8-bit CI is 11101110. The font bold and underlined portion is the indication of the third RUR.

Example 5

The schemes described in Examples 1-3 may be established on the determined RUR. In this embodiment, a method for specifically determining the RUR based on the UE capability is described.

In this embodiment, the base station sends the first DCI and the second DCI, where the first DCI carries the first UL CI, and the second DCI carries the second UL CI. The first UE and the second UE may have uplink transmission. The signaling processing capability of the first UE is weaker, and when the first UE receives DCI, the UE completes DCI decoding and resource cancellation after X1 time domain symbols. The signaling processing capability of the second UE is stronger, and when the second UE receives DCI, the UE completes DCI decoding and resource cancellation after X2 time domain symbols. X1≥W, X2≤W. The W is a UE capability standard predefined by the protocol. The first UE can receive the first DCI, and the second UE can receive the second DCI.

Figure 7:
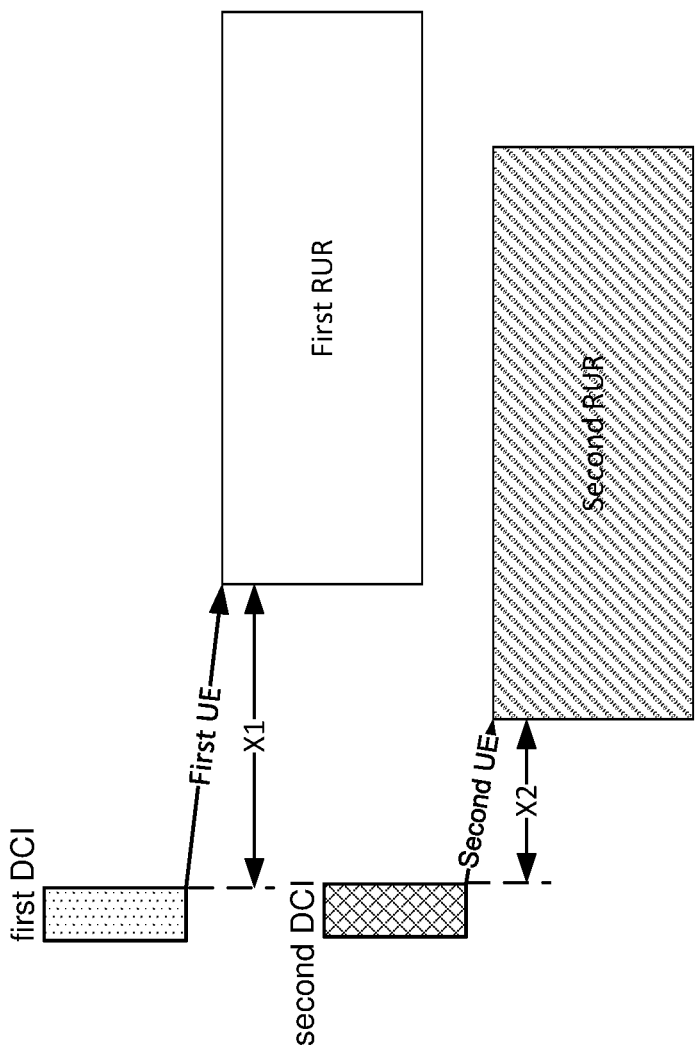
FIG. 7 depicts an example diagram of a UEs with different processing capabilities determining a RUR, in accordance with some example embodiments.

The method for determining the RUR by the first UE is as follows:

The first UE determines the starting time of the RUR according to the time when the first UE receives the first DCI. As shown in FIG. 7, the first UE can receive the first DCI, and the starting time of the first RUR is the X1 symbols after the end time domain symbol of the first DCI, and X1≥W. The length of the first RUR is determined by a predefined or higher layer signaling configuration or physical layer signaling indication. At this time, the first UE can cancel its own transmission in the first RUR to ensure the transmission of higher priority.

The method for determining the RUR by the second UE is as follows:

The second UE determines the starting time of the RUR according to the time when the second UE receives the second DCI. As shown in FIG. 7, the second UE can receive the second DCI, and the starting time of the second RUR is the X2 symbols after the end time domain symbol of the first DCI, and X2 W. The length of the second RUR is determined by a predefined or higher layer signaling configuration or physical layer signaling indication. At this time, the second UE can cancel its own transmission in the second RUR to ensure the transmission of higher priority.

Example 6

The schemes described in Examples 1-3 may be established on the determined RUR. In this embodiment, a method for specifically determining the RUR based on the UE capability is described.

The implementation of the technical solution will be further described in detail below with reference to the accompanying drawings:

In this embodiment, the base station sends a DCI, where the DCI carries the UL CI. The first UE and the second UE may have uplink transmission. The signaling processing capability of the first UE is weaker, and when the first UE receives DCI, the UE completes DCI decoding and resource cancellation after X1 time domain symbols. The signaling processing capability of the second UE is stronger, and when the second UE receives DCI, the UE completes DCI decoding and resource cancellation after X2 time domain symbols. X1≥W, X2 W. The first UE and the second UE are capable of receiving the DCI.

Figure 8:
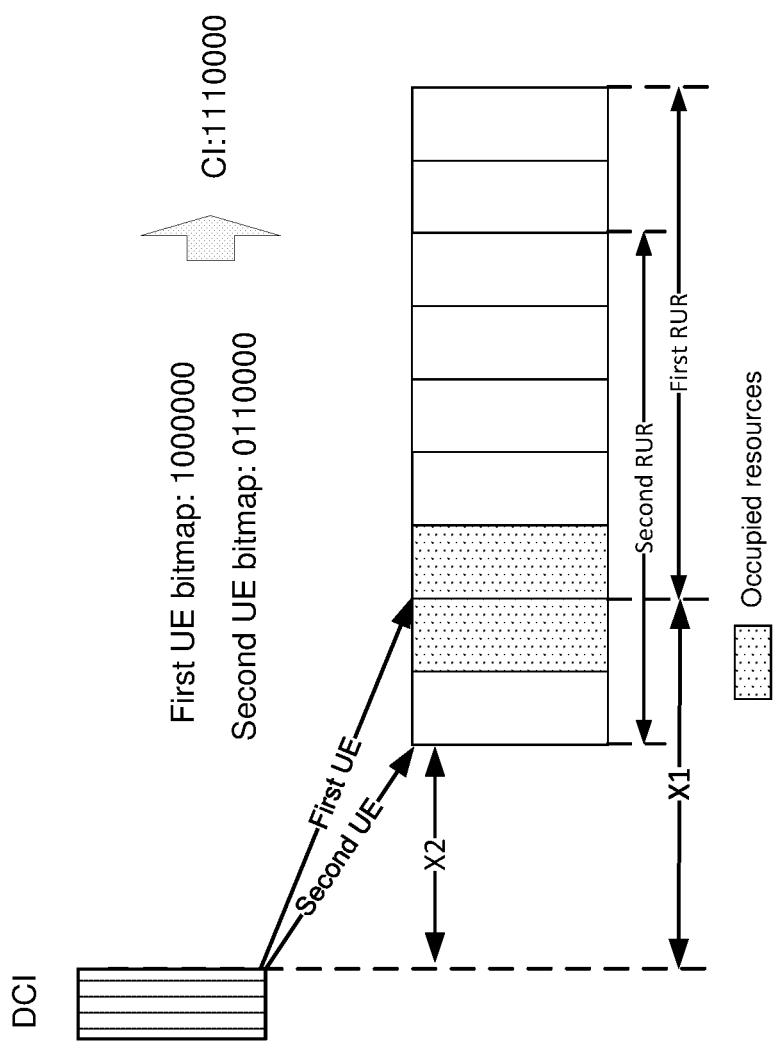
FIG. 8 depicts an example diagram of determining a RUR when UEs with different processing capabilities receive the same downlink control information (DCI), in accordance with some example embodiments.

The method for determining the RUR by the first UE is as follows:

The first UE determines the starting time of the RUR according to the time when the first UE receives the DCI. As shown in FIG. 8, the first UE can receive the DCI. The starting time of the first RUR is X1 symbols after the end time domain symbol of the DCI, and X1 W. The length of the first RUR is determined by a predefined or higher layer signaling configuration or physical layer signaling indication. At this time, the first UE can cancel its own transmission in the first RUR to ensure the transmission of higher priority.

The method for determining the RUR by the second UE is as follows:

The second UE determines the starting time of the RUR according to the time when the first UE receives the DCI. As shown in FIG. 8, the second UE can receive the DCI. The starting time of the second RUR is X2 symbols after the end time domain symbol of the DCI, and X2≤W. The length of the second RUR is determined by a predefined or higher layer signaling configuration or physical layer signaling indication. At this time, the second UE can cancel its own transmission in the second RUR to ensure the transmission of higher priority.

Further, as shown in FIG. 8, the UL CI of the DCI is used to indicate the merge information of the first UE and the second UE. The indication information of the first UE is 0110000, and the indication information of the second UE is 1000000. The UL CI indication information of the DCI is a union of the two pieces of indication information, which is 1110000.

Example 7

The schemes described in Examples 1-3 may be established on the determined RUR. In this embodiment, a method for specifically determining the RUR based on the UE capability is described.

In this embodiment, the base station sends a DCI, where the DCI carries a UL CI. The first UE and the second UE may have uplink transmission. The signaling processing capability of the first UE is weaker, and when the first UE receives DCI, the UE completes DCI decoding and resource cancellation after X1 time domain symbols. The signaling processing capability of the second UE is stronger, and when the second UE receives DCI, the UE completes DCI decoding and resource cancellation after X2 time domain symbols. X1 W. At this time, the first UE and the second UE are capable of receiving the DCI.

Figure 9:
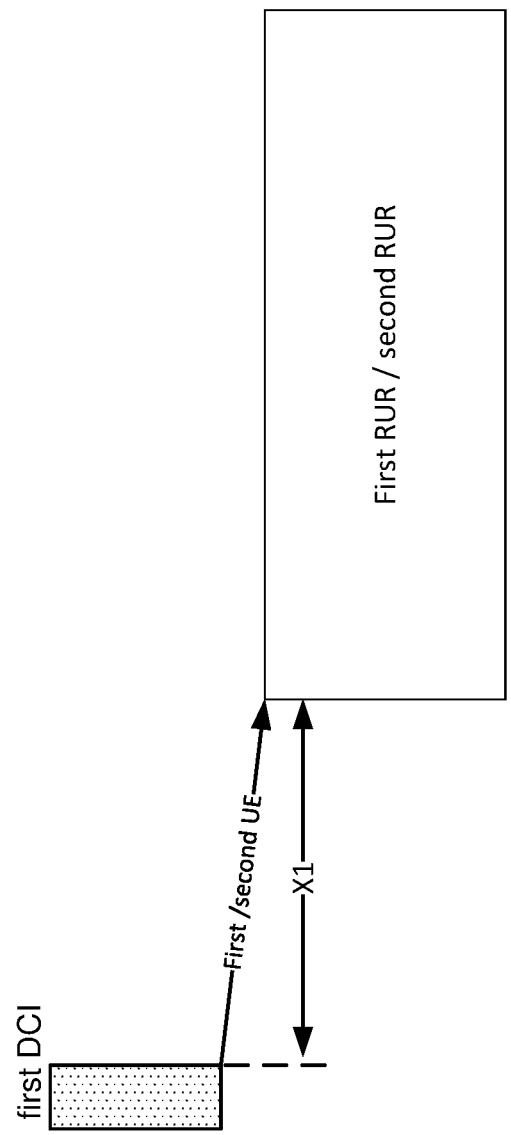
FIG. 9 depicts the first DCI and a first and second RUR, in accordance with some example embodiments.

A method for determining the RUR by the first UE is as follows:

The first UE determines the starting time of the RUR according to the time when the first UE receives the DCI. As shown in FIG. 9, the first UE can receive the DCI. The starting time of the first RUR is X1 symbols after the end time domain symbol of the DCI, and X1 W. At this time, the first UE can cancel its own transmission in the first RUR to ensure the transmission of higher priority.

A method for determining the RUR by the second UE is as follows:

The second UE determines the starting time of the RUR according to the time when the first UE receives the DCI. As shown in FIG. 9, the second UE can receive the DCI. The starting time of the second RUR is X1 symbols after the end time domain symbol of the DCI, and X1≤W. At this time, the second UE can cancel its own transmission in the second RUR to ensure the transmission of higher priority.

Further, if the length of the first RUR and the second RUR are equal, the first RUR and the second RUR are the same RUR. The first UE and the second UE have the same understanding of the UL CI. If the lengths of the first RUR and the second RUR are not equal, the first RUR and the second RUR are not the same RUR. The understanding of UL CI is related to the first RUR length and the second RUR length. For example, the first RUR size is 5, the second RUR size is 7, the UL CI indicates that the bitmap is 0110101, the UL CI understood by the first UE is 01101, and the UL CI understood by the second UE is 0110101.

FIG. 10 depicts a process 1000, in accordance with some example embodiments. At 1010, the process includes receiving, at a wireless terminal from a network node, an uplink cancellation indication. At 1020, the process includes determining, at the wireless terminal, an allocation of a reference uplink resource comprising a plurality of uplink time-frequency resources. At 1030, the process includes determining, by the wireless terminal, one or more of the plurality of uplink time-frequency resources to cancel according to the uplink cancellation indication. At 1040, the process includes cancelling, by the wireless terminal based on the uplink cancellation indication, an uplink transmission on the determined one or more of the plurality of uplink time-frequency resources.

In another example implementation, a method includes receiving, at a wireless terminal from a network node, an uplink cancellation indication. The method further includes determining, by the wireless terminal, an allocation of a reference uplink resources comprising a plurality of uplink time-frequency resources, and determining, by the wireless terminal, one or more of the plurality of uplink time-frequency resources to cancel according to the uplink cancellation indication. The method further includes cancelling, by the wireless terminal based on the uplink cancellation indication, an uplink transmission on the determined one or more of the plurality of uplink time-frequency resources and performing a transmission of one or more of the reference uplink resources not included in the uplink cancellation indication.

Figure 11:
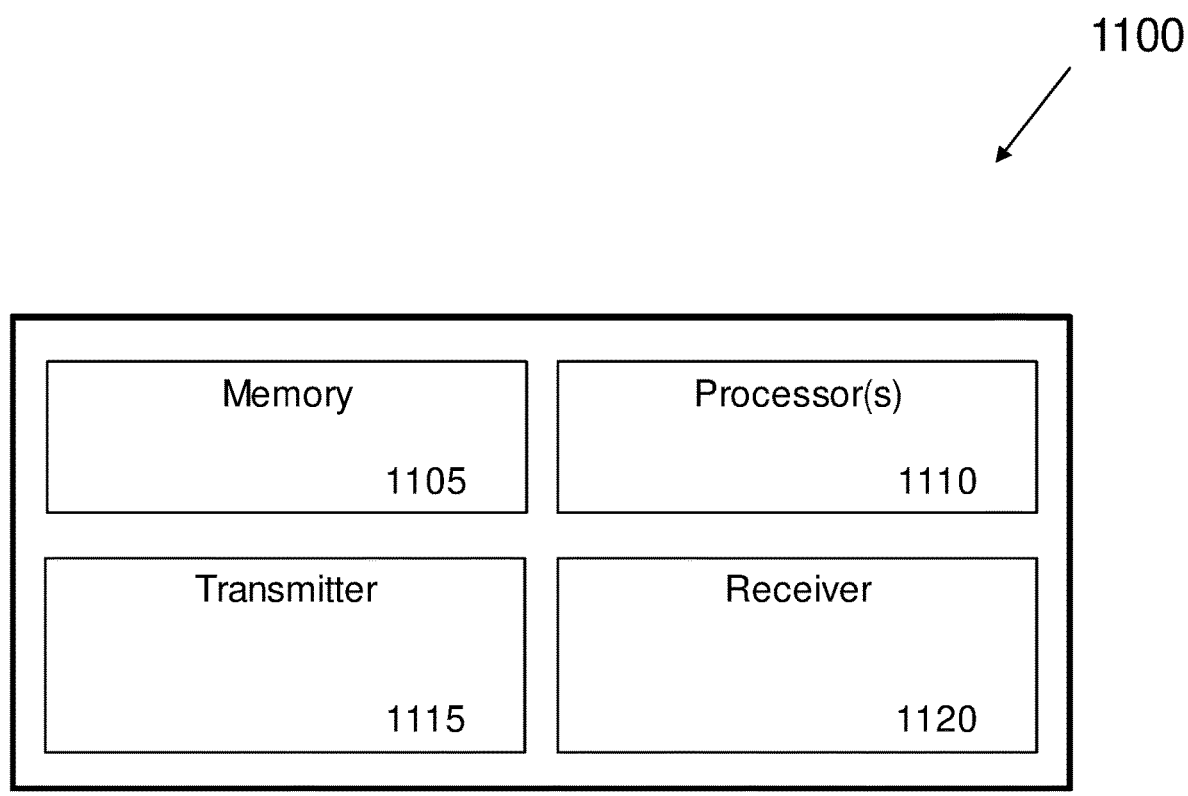
FIG. 11 depicts an apparatus, in accordance with some example embodiments.

FIG. 11 depicts a block diagram 1100 representing of a portion of a radio station. A radio station 1100 such as a network node or base station or a wireless device (or UE) can include one or more processors 1110 such as a microprocessor that implements one or more of the wireless techniques presented in this document. The radio station 1100 can include transmitter electronics 1115 to send, and receiver electronics 1120 to receive wireless signals over one or more communication interfaces such as an antenna. The radio station 1100 can include other communication interfaces for transmitting and receiving data. Radio station 1100 can include one or more memories 1105 configured to store information such as data and/or instructions. In some implementations, the processor electronics 1110 can include at least a portion of the transceiver electronics 1120/1115. In some embodiments, at least some of the disclosed techniques, modules or functions are implemented using the radio station 1100.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as bas stations. A network node includes a base station including a next generation Node B (gNB), enhanced Node B (eNB), or any other device that performs as a base station. A resource range may refer to a range of time-frequency resources or blocks.

Clause 1. A wireless communications method, comprising: receiving, at a wireless terminal from a network node, an uplink cancellation indication; determining, by the wireless terminal, an allocation of a reference uplink resources comprising a plurality of uplink time-frequency resources; determining, by the wireless terminal, one or more of the plurality of uplink time-frequency resources to cancel according to the uplink cancellation indication; and cancelling, by the wireless terminal based on the uplink cancellation indication, an uplink transmission on the determined one or more of the plurality of uplink time-frequency resources.

Clause 2. The wireless communications method of clause 1, further comprising: determining, at the wireless terminal, an uplink cancellation indication method from a plurality of predefined cancellation indication methods, wherein the uplink cancellation indication method is used for determining the one or more of the plurality of uplink time-frequency resources for cancelling.

Clause 3. The wireless communications method of clause 2, wherein the determining the uplink cancellation indication method from the plurality of predefined cancellation indication methods is performed using one or more distinguishing bits.

Clause 4. The wireless communications method of clause 2, wherein the determining the uplink cancellation indication method from the plurality of predefined cancellation indication methods is performed using a radio network temporary identifier (RNTI) different from the wireless terminal for the uplink cancellation indication.

Clause 5. The wireless communications method of clause 2, wherein the determining the uplink cancellation indication method from the plurality of predefined cancellation indication methods is performed using different search spaces for the uplink cancellation indication.

Clause 6. The wireless communications method of clause 1, further comprising: representing the reference uplink resource in a time domain as a one-dimensional (1D) bitmap and representing a time-frequency domain corresponding to cancelled time domain resources as a two-dimensional (2D) bitmap.

Clause 7. The wireless communications method of clause 1, further comprising: determining a starting time of the reference uplink resource after the receiving the uplink cancellation indication based on at least a processing capability of the wireless terminal.

Clause 8. The wireless communications method of clause 7, further comprising: determining a first processing time based on a first processing capability; and determining a second processing time based on a second processing capability, wherein the first processing time is longer than the second processing time.

Clause 9. The wireless communications method of clause 8, further comprising: receiving, at the wireless terminal, the uplink cancellation indication and a second uplink cancellation indication.

Clause 10. The wireless communications method of clause 9, further comprising: determining, by the wireless terminal, that the starting time of the reference uplink resource is the first processing time after a last time domain symbol of the uplink cancellation indication; and determining, by the wireless terminal, that the starting time of a second reference uplink resource is the second processing time after the last time domain symbol of the second uplink cancellation indication.

Clause 11. The wireless communications method of clause 8, further comprising: receiving, at the wireless terminal from the network node, a second uplink cancellation indication; and updating the uplink cancellation indication is based on the second uplink cancellation indication.

Clause 12. The wireless communications method of clause 11, wherein the updating the uplink cancellation indication based on the second uplink cancellation indication comprises: determining a resource range to update in the one or more of the plurality of uplink time-frequency resources; and determining that the starting time of the resource range is the first processing time after a last time domain symbol of the second uplink cancellation indication, and an ending time of the resource range is a last time domain symbol of an overlap between the first reference uplink resource and the second reference uplink resource.

Clause 13. The wireless communications method of clause 11, wherein the updating the uplink cancellation indication based on the second uplink cancellation indication comprises: determining a resource range to update in the one or more of the plurality of uplink time-frequency resources; and determining that the starting time of the resource range is the first time domain symbol of an overlap between the first reference uplink resource and the second reference uplink resource, and an ending time of the resource range is a last time domain symbol of the overlap between the first reference uplink resource and the second reference uplink resource.

Clause 14. The wireless communications method of clause 7, further comprising: determining a first processing time based on a first processing capability of a first wireless terminal; and determining a second processing time based on a second processing capability of a second wireless terminal, wherein the first processing time is longer than the second processing time.

Clause 15. The wireless communications method of clause 9, further comprising: determining, by the second wireless terminal, that the starting time of the reference uplink resource is the first processing time after a last time domain symbol of the uplink cancellation indication.

Clause 16. A wireless communications method, comprising: determining, by a network node, one or more of the plurality of uplink time-frequency resources to cancel; and sending, by a network node to a wireless terminal, an uplink cancellation indication.

Clause 17. The wireless communications method of clause 16, further comprising: determining, at the network node, an uplink cancellation indication method from a plurality of predefined cancellation indication methods, wherein the uplink cancellation indication method is used for determining the one or more of the plurality of uplink time-frequency resources for cancelling.

Clause 18. The wireless communications method of clause 17, wherein the determining the uplink cancellation indication method from the plurality of predefined cancellation indication methods is performed using one or more distinguishing bits.

Clause 19. The wireless communications method of clause 17, wherein the determining the uplink cancellation indication method from the plurality of predefined cancellation indication methods is performed using a radio network temporary identifier (RNTI) different from the wireless terminal for the uplink cancellation indication.

Clause 20. The wireless communications method of clause 17, wherein the determining the uplink cancellation indication method from the plurality of predefined cancellation indication methods is performed using different search spaces for the uplink cancellation indication.

Clause 21. The wireless communications method of clause 1, wherein the uplink cancellation indication in included in a downlink control information (DCI).

Clause 22. The wireless communications method of clause 16, wherein the uplink cancellation indication in included in a downlink control information (DCI).

Clause 23. An apparatus comprising a processor configured to implement a method recited in one or more of clauses 1 to 22.

Clause 24. A computer program product having code stored thereon, wherein the code, when executed by a processor, causes the processor to implement a method recited in one or more of clauses 1 to 22.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communications method, comprising:
receiving, at a wireless terminal from a network node, a first downlink control information that includes a first uplink cancellation indication and a second downlink control information that includes a second uplink cancellation indication;

determining, by the wireless terminal, a starting time of a first reference uplink resource comprising a plurality of uplink time-frequency resources based on a location where the first downlink control information ends and a starting time of a second reference uplink resource based on a location where the second downlink control information ends;

determining, by the wireless terminal, one or more of the plurality of uplink time-frequency resources to cancel according to the first uplink cancellation indication and the second uplink cancellation indication; and cancelling, by the wireless terminal based on the uplink cancellation indication, an uplink transmission on the determined one or more of the plurality of uplink time-frequency resources based on the starting time of the first reference uplink resource or the starting time of the second reference uplink resource.

2. The wireless communications method of claim 1, further comprising:

determining, at the wireless terminal, an uplink cancellation indication method from a plurality of predefined cancellation indication methods, wherein the uplink cancellation indication method is used for determining the one or more of the plurality of uplink time-frequency resources for cancelling.

3. The wireless communications method of claim 2, wherein the determining the uplink cancellation indication method from the plurality of predefined cancellation indication methods is performed using one or more distinguishing bits.

4. The wireless communications method of claim 2, wherein the determining the uplink cancellation indication method from the plurality of predefined cancellation indication methods is performed using a radio network temporary identifier (RNTI) different from the wireless terminal for the uplink cancellation indication.

5. The wireless communications method of claim 2, wherein the determining the uplink cancellation indication method from the plurality of predefined cancellation indication methods is performed using different search spaces for the uplink cancellation indication.

6. The wireless communications method of claim 1, further comprising:

representing the first reference uplink resource in a time domain as a one-dimensional (1D) bitmap and representing a time-frequency domain corresponding to cancelled time domain resources as a two-dimensional (2D) bitmap.

7. The wireless communications method of claim 1, wherein the wireless terminal is a first wireless terminal with a first processing capability or a second wireless terminal with a second processing capability, wherein the starting time of the first reference uplink resource is determined based on the first processing capability of the first wireless terminal, and the starting time of the second reference uplink resource is determined based on the second processing capability of the second wireless terminal, wherein a first processing time based on the first processing capability is longer than a second processing time based on the second processing capability.

8. The wireless communications method of claim 7, further comprising:

determining the first processing time based on the first processing capability; and determining the second processing time based on the second processing capability, wherein the first processing time is longer than the second processing time.

9. The wireless communications method of claim 8, further comprising:

receiving, at the wireless terminal, the uplink cancellation indication and a second uplink cancellation indication.

10. The wireless communications method of claim 9, further comprising:

determining, by the wireless terminal, that the starting time of the reference uplink resource is the first processing time after a last time domain symbol of the uplink cancellation indication; and determining, by the wireless terminal, that the starting time of a second reference uplink resource is the second processing time after the last time domain symbol of the second uplink cancellation indication.

11. The wireless communications method of claim 8, further comprising:

updating the first uplink cancellation indication based on the second uplink cancellation indication.

12. The wireless communications method of claim 11, wherein the updating the uplink cancellation indication based on the second uplink cancellation indication comprises:

determining a resource range to update in the one or more of the plurality of uplink time- frequency resources; and determining that the starting time of the resource range is the first processing time after a last time domain symbol of the second uplink cancellation indication, and an ending time of the resource range is a last time domain symbol of an overlap between the first reference uplink resource and the second reference uplink resource.

13. The wireless communications method of claim 11, wherein the updating the uplink cancellation indication based on the second uplink cancellation indication comprises:

determining a resource range to update in the one or more of the plurality of uplink time- frequency resources; and determining that the starting time of the resource range is the first time domain symbol of an overlap between the first reference uplink resource and the second reference uplink resource, and an ending time of the resource range is a last time domain symbol of the overlap between the first reference uplink resource and the second reference uplink resource.

14. The wireless communications method of claim 9, further comprising:

determining, by the second wireless terminal, that the starting time of the reference uplink resource is the first processing time after a last time domain symbol of the uplink cancellation indication.

15. A wireless communications method, comprising:

determining, by a network node, one or more of a plurality of uplink time-frequency resources to cancel; and sending, by the network node to a wireless terminal, a first downlink control information that includes a first uplink cancellation indication and a second downlink control information that includes a second uplink cancellation indication, wherein a starting time of a first reference uplink resource based on a location where the first downlink control information ends and a starting time of a second reference uplink resource based on a location where the second downlink control information ends,
wherein the one or more of the plurality of uplink time-frequency resources to cancel are determined according to the first uplink cancellation indication and the second uplink cancellation indication.

16. The wireless communications method of claim 15, further comprising:
determining, at the network node, an uplink cancellation indication method from a plurality of predefined cancellation indication methods, wherein the uplink cancellation indication method is used for determining the one or more of the plurality of uplink time-frequency resources for cancelling.

17. The wireless communications method of claim 16, wherein the determining the uplink cancellation indication method from the plurality of predefined cancellation indication methods is performed using one or more distinguishing bits.

18. The wireless communications method of claim 16, wherein the determining the uplink cancellation indication method from the plurality of predefined cancellation indication methods is performed using a radio network temporary identifier (RNTI) different from the wireless terminal for the uplink cancellation indication.

19. The wireless communications method of claim 16, wherein the determining the uplink cancellation indication method from the plurality of predefined cancellation indication methods is performed using different search spaces for the uplink cancellation indication.

20. A wireless terminal comprising at least one processor configured to cause the wireless terminal to implement a method comprising:
receiving, at the wireless terminal from a network node, a first downlink control information that includes a first uplink cancellation indication and a second downlink control information that includes a second uplink cancellation indication;
determining, by the wireless terminal, a starting time of a first reference uplink resource comprising a plurality of uplink time-frequency resources based on a location where the first downlink control information ends and a starting time of a second reference uplink resource based on a location where the second downlink control information ends;
determining, by the wireless terminal, one or more of the plurality of uplink time-frequency resources to cancel according to the first uplink cancellation indication and the second uplink cancellation indication; and
cancelling, by the wireless terminal based on the uplink cancellation indication, an uplink transmission on the determined one or more of the plurality of uplink time-frequency resources based on the starting time of the first reference uplink resource or the starting time of the second reference uplink resource.

21. The wireless terminal of claim 20, wherein the method further comprises:
determining, at the wireless terminal, an uplink cancellation indication method from a plurality of predefined cancellation indication methods, wherein the uplink cancellation indication method is used for determining the one or more of the plurality of uplink time-frequency resources for cancelling.

22. The wireless terminal of claim 20, wherein the method further comprises:
representing the first reference uplink resource in a time domain as a one-dimensional (1D) bitmap and representing a time-frequency domain corresponding to cancelled time domain resources as a two-dimensional (2D) bitmap.

23. The wireless terminal of claim 20, wherein the wireless terminal is a first wireless terminal with a first processing capability or a second wireless terminal with a second processing capability, wherein the starting time of the first reference uplink resource is determined based on the first processing capability of the first wireless terminal, and the starting time of the second reference uplink resource is determined based on the second processing capability of the second wireless terminal, wherein a first processing time based on the first processing capability is longer than a second processing time based on the second processing capability.

* * * * *